US012787081B2

(12) United States Patent
Kim et al.

(10) Patent No.: US 12,787,081 B2
(45) Date of Patent: Nov. 3, 2026

(54) AUGMENTED REALITY DEVICE PERFORMING AUTO PARKING WITH WIRELESS AUDIO DEVICE BASED ON SIGNAL INTENSITY

(71) Applicant: SAMSUNG ELECTRONICS CO., LTD., Suwon-si (KR)

(72) Inventors: Jeongwon Kim, Suwon-si (KR); Jaewoo Ko, Suwon-si (KR); Bonkon Koo, Suwon-si (KR); Sangho Yoon, Suwon-si (KR); Soonseob Han, Suwon-si (KR); Doyoun Kim, Suwon-si (KR); Sunghwan Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 779 days.

(21) Appl. No.: 18/094,842

(22) Filed: Jan. 9, 2023

(65) Prior Publication Data

US 2023/0164858 A1 May 25, 2023

Related U.S. Application Data

(63) Continuation of application No. PCT/KR2021/006490, filed on May 25, 2021.

(30) Foreign Application Priority Data

Jul. 10, 2020 (KR) ........................ 10-2020-0085676

(51) Int. Cl.

| | |
|---|---|
| ***H04W 76/14*** | (2018.01) |
| ***G06T 19/00*** | (2011.01) |
| ***H04W 52/02*** | (2009.01) |

(52) U.S. Cl.
CPC ........... *H04W 76/14* (2018.02); *G06T 19/006* (2013.01); *H04W 52/0261* (2013.01)

(58) Field of Classification Search
CPC .. H04W 76/14; H04W 52/0261; G06T 19/006
See application file for complete search history.

(56) References Cited

U.S. PATENT DOCUMENTS 8,686,924 B2 * 4/2014 Braun ..................... G06F 3/012 345/9
9,325,828 B1 * 4/2016 Oh .................... H04M 1/72454
(Continued)

FOREIGN PATENT DOCUMENTS

EP 2355563 A1 * 8/2011 ............ H04W 8/005
JP 2017-183857 A 10/2017
KR 10-2070703 B1 1/2020

OTHER PUBLICATIONS

Communication dated Sep. 20, 2024, issued by the Korean Intellectual Property Office in Korean Application No. 10-2020-0085676.
(Continued)

*Primary Examiner* — Tonia L Dollinger
(74) *Attorney, Agent, or Firm* — Sughrue Mion, PLLC

(57) ABSTRACT

An augmented reality device includes a sensor, a communication interface, a memory, and a processor configured to, based on a first signal received from the sensor, control an operation of the communication interface according to whether the augmented reality device is being worn; and perform auto pairing with a wireless audio device according to whether an intensity of a second signal of a pairing packet received from the wireless audio device through the communication interface is within a predetermined range for allowing auto pairing with the wireless audio device.

13 Claims, 10 Drawing Sheets

(56) References Cited

U.S. PATENT DOCUMENTS

| | | | | |
|---|---|---|---|---|
| 9,900,695 | B2 | 2/2018 | Yang et al. | |
| 9,921,657 | B2 | 3/2018 | Sprenger et al. | |
| 9,961,482 | B2 * | 5/2018 | Park | G06F 11/3058 |
| 9,964,770 | B2 | 5/2018 | Guo | |
| 10,061,352 | B1 | 8/2018 | Trail | |
| 10,409,091 | B2 | 9/2019 | Hviid | |
| 10,459,236 | B2 | 10/2019 | Lee et al. | |
| 10,582,328 | B2 | 3/2020 | Milevski et al. | |
| 2008/0070566 | A1 * | 3/2008 | Athalye | H04W 52/0245 455/425 |
| 2016/0004306 | A1 * | 1/2016 | Maltz | G02B 27/0172 345/173 |
| 2016/0150350 | A1 | 5/2016 | Ingale et al. | |
| 2017/0086127 | A1 * | 3/2017 | Patel | G06F 21/50 |
| 2017/0109131 | A1 | 4/2017 | Boesen | |
| 2017/0195829 | A1 | 7/2017 | Belverato et al. | |
| 2018/0007255 | A1 * | 1/2018 | Tang | G06V 10/147 |
| 2018/0061449 | A1 | 3/2018 | Dávila et al. | |
| 2018/0124497 | A1 | 5/2018 | Boesen | |

OTHER PUBLICATIONS

International Search Report (PCT/ISA/210) issued Aug. 27, 2021 by the International Searching Authority in International Application No. PCT/KR2021/006490.

Written Opinion (PCT/ISA/237) issued Aug. 27, 2021 by the International Searching Authority in International Application No. PCT/KR2021/006490.

* cited by examiner

AUGMENTED REALITY DEVICE PERFORMING AUTO PARKING WITH WIRELESS AUDIO DEVICE BASED ON SIGNAL INTENSITY

CROSS-REFERENCE TO RELATED APPLICATIONS

This application is a bypass continuation application of International Application No. PCT/KR2021/006490 filed on May 25, 2021, which is based on and claims priority to Korean Patent Application No. 10-2020-0085676, filed on Jul. 10, 2020, in the Korean Intellectual Property Office, the disclosures of which are incorporated by reference herein in their entireties.

BACKGROUND

1. Field

The disclosure relates to an augmented reality device and an augmented reality system.

2. Description of Related Art

Augmented reality is a technique to show an image combining a virtual world or virtual-world object with a real world or real-world object by projecting a virtual image on a physical environmental space or an object of the real world. An augmented reality device shows a real scene and a virtual image together, through a see-through-type display arranged in front of eyes of a user and worn on the face or the head of the user.

With the development of Internet of things (IoT) technologies, techniques for connecting devices to each other have been developed. For example, devices supporting Bluetooth communication may be automatically connected to each other when the devices are in a coverage range for Bluetooth communication and one of the devices is registered to another device during an initial connection process.

SUMMARY

Provided is an augmented reality device restrictively allowing auto pairing with a wireless audio device by configuring an allowable range for allowing auto pairing between the augmented reality device and the wireless audio device.

In accordance with an aspect of the disclosure, an augmented reality device includes: a sensor; a communication interface: a memory configured to store one or more instructions; and a processor configured to execute the one or more instructions to: based on a first signal received from the sensor, control an operation of the communication interface according to whether the augmented reality device is being worn; and perform auto pairing with a wireless audio device according to whether an intensity of a second signal of a pairing packet received from the wireless audio device through the communication interface is within a predetermined range for allowing auto pairing with the wireless audio device.

The processor may be further configured to execute the one or more instructions to perform the auto pairing by comparing the intensity of the second signal of the received pairing packet with an intensity of a third signal corresponding to a maximum allowable distance for allowing the auto pairing between the wireless audio device and the augmented reality device.

The processor may be further configured to execute the one or more instructions to: based on the intensity of the second signal of the received pairing packet being greater than or equal to the intensity of the third signal corresponding to the maximum allowable distance, perform the auto pairing; and based on the intensity of the second signal of the received pairing packet being less than the intensity of the third signal corresponding to the maximum allowable distance, periodically scan for a pairing packet within a communicable range of the communication interface.

The processor may be further configured to execute the one or more instructions to, based on determining that the augmented reality device is being worn using the first signal received from the sensor, switch from a first operating mode to a second operating mode.

The processor may be further configured to execute the one or more instructions to, after switching to the second operating mode, periodically scan, using the communication interface, for a pairing packet within a communicable range of the communication interface and receive, using the communication interface, a pairing packet broadcast from the wireless audio device.

The sensor may be configured to operate in the first operating mode and the second operating mode, and the communication interface may be configured to operate in the second operating mode and not operate in the first operating mode.

The first operating mode may be a disable mode for deactivating the communication interface, and the second operating mode may be an enable mode for activating the communication interface.

A power supply may be configured to: not supply power to the communication interface in the first operating mode which is a sleep mode, and supply power to the communication interface in the second operating mode which is a wake-up mode.

The sensor may be mounted at a position to track a pupil of a user wearing the augmented reality device and the sensor may be configured to transmit, to the processor, a fourth signal corresponding to eye information of the user.

The sensor may be mounted at a position toward a body part of a user on which the augmented reality device is worn, and the sensor may be configured to transmit, to the processor, a fifth signal corresponding to a time in which light or ultrasonic waves emitted to the body part of the user returns via reflection.

The sensor may be mounted at a position contacting a body part of a user on which the augmented reality device is worn, and the sensor may be configured to transmit, to the processor, a sixth signal corresponding to at least one of an electrocardiogram, a heartbeat, and a capacitance measured when the sensor contacts the body part of the user.

In accordance with another aspect of the disclosure, an augmented reality system includes: a wireless audio device configured to, based on determining that the wireless audio device is being worn by using a first sensor, operate a first communication interface and broadcast a pairing packet through the first communication interface; and an augmented reality device configured to, based on determining that the augmented reality device is being worn by using a second sensor, operate a second communication interface and perform auto pairing with the wireless audio device according to whether an intensity of a first signal of a pairing packet received, through the second communication interface, from the wireless audio device is within a predetermined range for allowing auto pairing with the wireless audio device.

The augmented reality device may be further configured to perform the auto pairing by comparing the intensity of the first signal of the received pairing packet with an intensity of a second signal corresponding to a maximum allowable distance for allowing the auto pairing between the wireless audio device and the augmented reality device.

The augmented reality device may be further configured to, based on determining that the augmented reality device is being worn by using a third signal received from the second sensor, switch from a first operating mode to a second operating, mode to operate the second communication interface, and the wireless audio device may be further configured to, based on determining that the wireless audio device is being worn by using a fourth signal received from the first sensor, switch from a third operating mode to a fourth operating mode to operate the first communication interface.

In accordance with another aspect of the disclosure, a non-transitory computer-readable recording medium having recorded thereon a program to be executed by a computer includes: instructions for controlling an operation of a communication interface, according to whether an augmented reality device is being worn, based on a first signal received from a sensor; and instructions for performing auto pairing with a wireless audio device according to whether an intensity of a second signal of a pairing packet received, through the communication interface from the wireless audio device, is within a predetermined range for allowing auto pairing with the wireless audio device.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
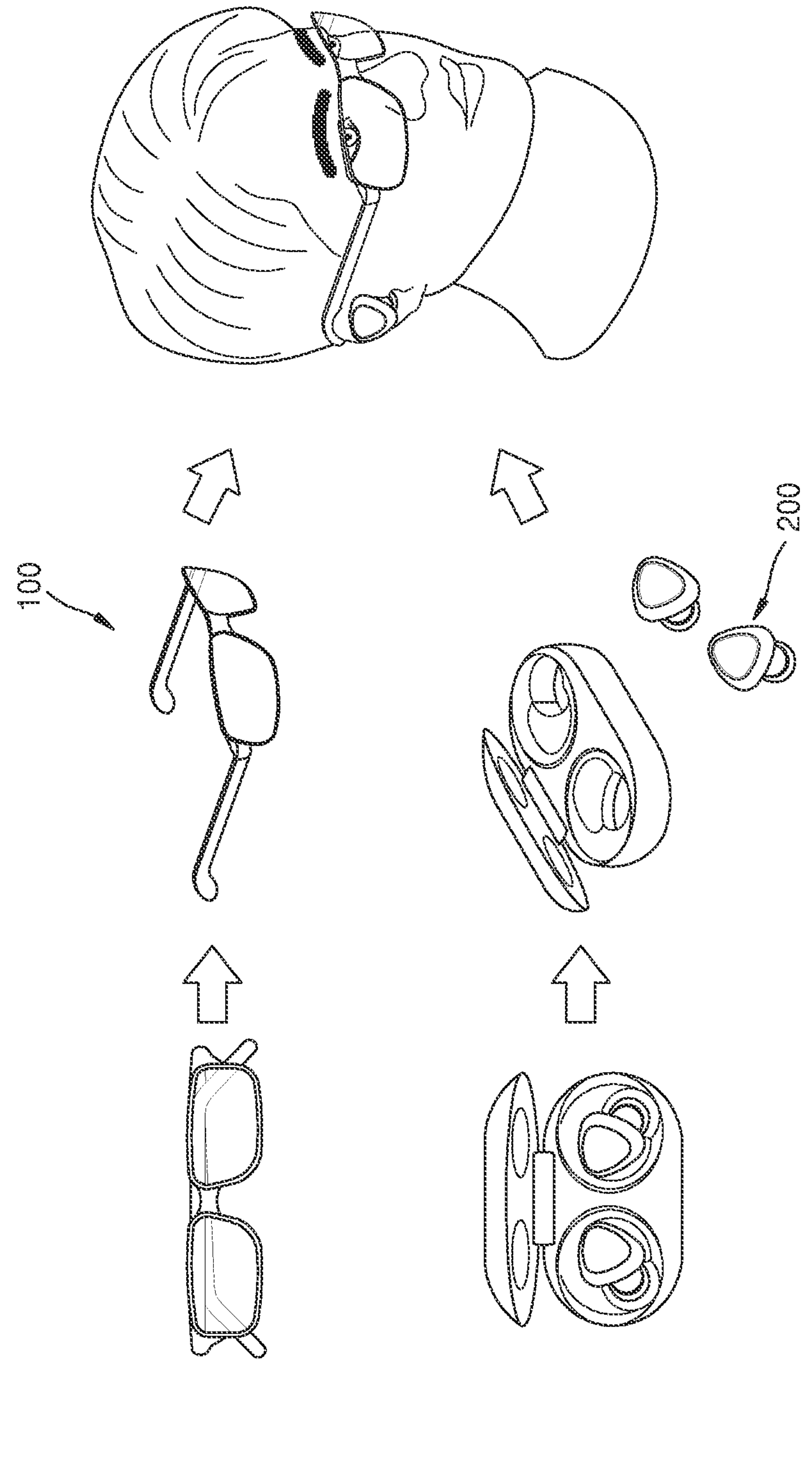
FIG. 1 is a diagram showing a scene in which a user wears an augmented reality device and a wireless audio device.

Hereinafter, embodiments of the disclosure will be described in detail with reference to the accompanying drawings, so that the embodiments of the disclosure may be easily implemented by one of ordinary skill in the art. The disclosure may have different forms and should not be construed as being limited to the embodiments described herein.

Throughout the disclosure, it will be understood that when, an element is referred to as "including" an element, the element may further include another element, rather than excluding the other element, unless mentioned otherwise. Also, the term, such as "unit" or "module," used in the specification, refers to a unit that, processes at least one function or operation, and this may be implemented by hardware, software or a combination of hardware and software.

In the disclosure, "augmented reality (AR)" denotes showing also a virtual image in a physical environmental space of a real world or showing a real world object and a virtual image together.

Also, an "augmented reality device" refers to a device for representing "augmented reality," which includes not only glasses-shaped augmented reality glasses, generally worn on a facial portion of a user, but also includes a head mounted display (HMD) apparatus or an augmented reality helmet worn on a head portion.

A "real scene" is a scene of a real world that a user sees through the augmented reality device and may include (a) real world object(s). Also, a "virtual image" is an image generated by an optical engine and may include both a still image and a dynamic image. The virtual image is viewed together with the real scene and may be an image showing information with respect to a real world object in the real scene or information or a control menu with respect to an operation of the augmented reality device.

Thus, generally, an augmented reality device includes an optical engine for generating a virtual image, which is formed by light generated from a light source, and a light guide plate (a waveguide) guiding the virtual image generated by the optical engine to eyes of a user and including a transparent material to shown a scene of the real world together. As described above, because the augmented reality device has to show the scene of the real world, in order to guide light generated by the optical engine to the eyes of the user through the light guide plate, an optical element configured to change a path of light basically having linear characteristics is needed. Here, the path of light may be changed by using reflection by a mirror, etc., or may be changed via diffraction by a diffractive device, such as a diffractive optical element (DOE), a holographic optical element (HOE), etc. However, the disclosure is not limited thereto.

In the disclosure, "auto pairing" refers to a process in which after one device of two devices supporting the same communication rules is registered to the other device during an initial communication connection, the two devices are automatically connected with each other under a condition allowing communication connection between the two devices. When communication rules for performing communication connection between two devices, such as Wi-Fi direct, ultra-wideband (UWB), etc., in addition to Bluetooth communication are used, auto pairing ay be performed.

In the disclosure, a "pairing packet" refers to data containing information for auto pairing, and when the communication rules for performing communication connection between two devices, such as Wi-Fi direct, UWB, etc., in addition to Bluetooth communication are used, transmission and reception of the pairing packet between the two devices may be performed for auto pairing.

In the disclosure, a "broadcast" or "broadcasting" refers to periodic data transmission by a first device (a transmission-end device) in order to transmit a pairing packet to a second device (a reception-end device) performing a scanning operation on the pairing packet, in a communication connection process between the devices supporting homogeneous communication rules. When the communication rules for performing communication connection between two devices, such as Wi-Fi direct, UWB, etc., in addition to Bluetooth communication are used, either one device may perform the broadcast or broadcasting.

In the disclosure, a "scan" or "scanning" refers to periodic reception of an ambient signal by the second device (the reception-end device) in order to receive the pairing packet from the first device (the transmission-end device) broadcasting the pairing packet, in the communication connection process between the devices supporting homogeneous cot mu cation rules. When the communication rules for performing communication connection between two devices, such as Wi-Fi direct, UWB, etc., in addition to Bluetooth communication are used, the other device may perform the scan or scanning.

FIG. 1 is a diagram showing scene in which a user wears an augmented reality device 100 and a wireless audio device 200.

Referring to FIG. 1, to wear the augmented reality device 100 and the wireless audio device 200, the user may turn on each of the augmented reality device 100 and the wireless audio device 200 and wear each of the reality device 100 and the wireless audio device 200 on a wearing part corresponding to each device. For example, in the case of the augmented reality device 100 provided as glasses as illustrated in FIG. 1, the augmented reality device 100 may be turned on, when the user unfolds folded glasses legs or presses an additional power button. The user may wear, on the head, the augmented reality device 100 that is turned on, like glasses. In FIG. 1, the augmented reality device 100 is provided as glasses. However, embodiments are not limited thereto. Hereinafter, various types of devices are commonly referred to as the augmented reality device 100. The wireless audio device 200 provided as a pair of earphones may be turned on, when the user detaches the wireless audio device 200 from a case. The user may wear, on the ears, the wireless audio device 200 that is turned on. In FIG. 1, the wireless audio device 200 is provided as earphones. However, embodiments are not limited thereto. Hereinafter, various types of devices including a headset-type device are commonly referred to as the wireless audio device 200.

The user wearing the augmented reality device 100 may experience augmented reality in which a virtual image is projected on a real scene including a real world object. The virtual image may be information about the real world object in the real scene or information about an operation of the augmented reality device 100, or may be an image indicating a control menu, etc., and the user may view the real scene and the virtual image together through the augmented reality device 100. When communication is connected between the augmented reality device 100 and the wireless audio device 200, the augmented reality device 100 may transmit, to the wireless audio device 200, information with respect to augmented reality or an audio signal corresponding to information with respect to an operation or a control menu of the augmented reality device 100. The user wearing the wireless audio device 200 may hear, through the wireless audio device 200, the information with respect to augmented reality or the information with respect to the operation or the control menu of the augmented reality device 100, shown through the augmented reality device 100, without causing noise to the outside.

The augmented reality device 100 may perform communication connection with a plurality of accessory products, such as the wireless audio device 200. For example, when both of the wireless audio device 200 "A" and the wireless audio device 200 "B" once paired with, the augmented reality device 100 "X," are within a communicable range with respect to the augmented reality device 100 "X," and a user attempts to communication-connect the wireless audio device 200 "A" with the augmented reality device 100 "X," the wireless audio device 200 "B" for which communication connection is not intended may also be auto paired with the augmented reality device 100 even when the user wants auto pairing only between the wireless audio device 200 "A" and the augmented reality device 100 "X," when another user configures a broadcast mode of the wireless audio device 200 "B" in order to communication-connect the wireless audio device 200 "B" with the augmented reality device 100 "Y." In this case, the wireless audio device 200 "B" may be auto paired with the augmented reality device 100 "X," and thus, the other user may experience the inconvenience of not being able to connect the wireless audio device 200 "B" with the augmented reality device 100 "Y." Even when the wireless audio device 200 "B" is capable of multi-pairing, and the wireless audio device 200 "B" is also auto paired with the augmented reality device 100 "Y," an audio signal received from the augmented reality device 100 "X" may cause noise. Hereinafter, a method of restrictively allowing auto pairing by configuring an allowable range for allowing auto pairing between devices will be described.

Figure 2:
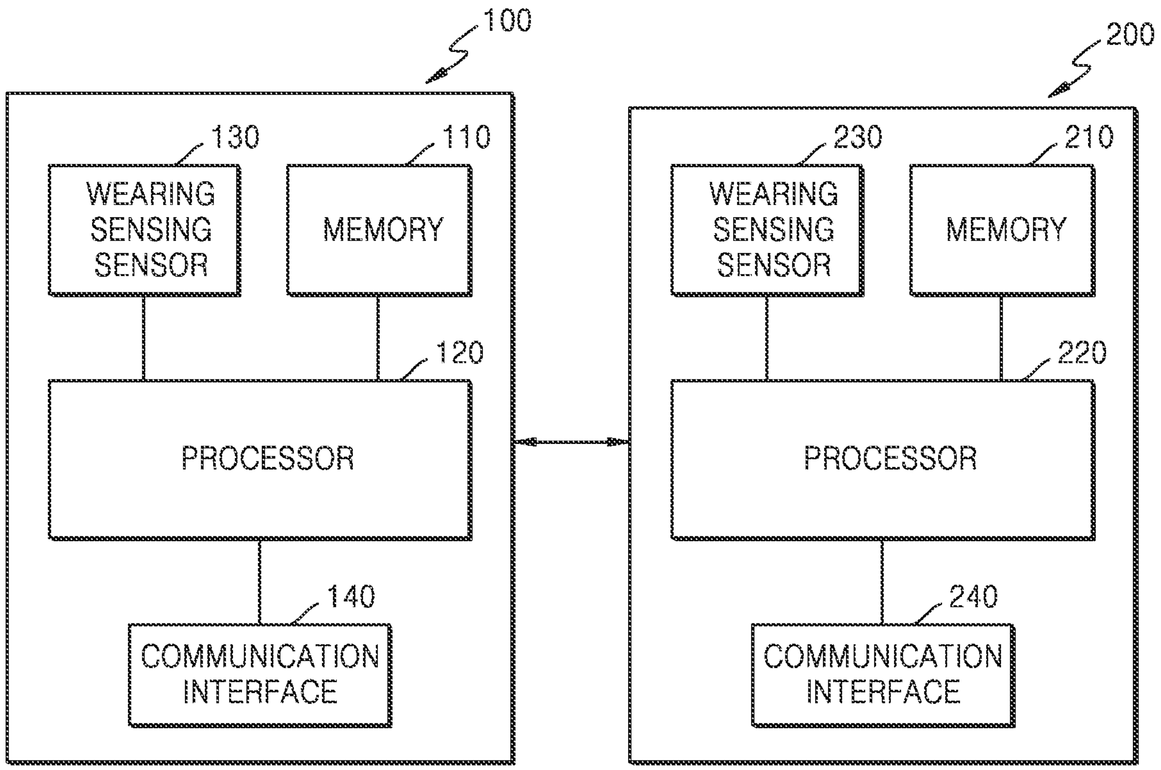
FIG. 2 is a diagram showing components of each of an augmented reality device and a wireless audio device.

FIG. 2 is a diagram showing components of each of the augmented reality device 100 and the wireless audio device 200.

Referring to FIG. 2, the augmented reality device 100 may include a memory 110, a processor 120, a wearing sensing sensor 130 (e.g., sensor), and a communication interface 140. One of ordinary skill in the art may understand that other general-purpose components may further be included, in addition to the components illustrated in FIG. 2.

The memory 110 may store instructions executable by the processor 120. The memory 110 may store a program including instructions. The memory 110 may include, for example, at least one type from among random access memory (RAM), static random access memory (SRAM), read-only memory (ROM), a flash memory, electrically erasable programmable read-only memory (EEPROM), programmable read-only memory (PROM), and a magnetic memory.

The memory 110 may store at least one software module including instructions. Each software module may be executed by the processor 120 so that the augmented reality device 100 may perform a predetermined operation or function. For example, the memory 110 may store a wearing sensing module, an operating mode control module, and an auto pairing allowing module, but is not limited thereto. The memory 110 may store one or more among the same or may further include other software modules. The instructions or the software modules stored in the memory 110 will be described below with reference to FIGS. 3 and 4.

The processor 120 may execute the instructions or programmed software modules stored in the memory 110 to control operations or functions performed by the augmented reality device 100. The processor 120 may include hardware components performing arithmetic, logic, and input and output operations and signal processing.

The processor 120 may include, for example, at least one piece of hardware from among a central processing unit, a microprocessor, a graphics processing unit, application specific integrated circuits (ASICs), digital signal processors (DSPs), digital signal processing devices (DSPDs), programmable logic devices (PLDs), and field programmable gate arrays (FPGAs), but is not limited thereto.

The wearing sensing sensor 130 may sense whether or not the augmented reality device 100 is worn by a user. The wearing sensing sensor 130 may be implemented as various types of sensors capable of sensing whether or not the augmented reality device 100 is worn. For example, the wearing sensing sensor 130 may include an eye-tracking sensor, a non-touch sensor, a touch sensor, etc. and may include one or more sensors. The wearing sensing sensor 130 may sense whether or not the augmented reality device 100 is worn, by using homogeneous sensors or heterogeneous sensors together.

When the wearing sensing sensor 130 is an eye-tracking sensor, the wearing sensing sensor 130 may be mounted at a position to track the pupil of a user wearing the augmented reality device 100 and may transmit a signal corresponding to user's eyes information to the processor 120. The eye-tracking sensor may detect the eyes information, such as an eye direction of eyes of a user, a position of the pupil of the eyes of the user, a central coordinate of the pupil, or the like. The processor 120 may determine a type of an eye movement based on the user's eyes information detected by the eye-tracking sensor. For example, based on the eyes information obtained by the eye-tracking sensor, the processor 120 may determine various types of eye movements including fixation, in which eyes are fixed to one spot, pursuit, in which eyes purse an moving object, saccade, in which eyes rapidly move from one glancing point to another glancing point, etc.

When the wearing sensing sensor 130 is a non-touch sensor, the wearing sensing sensor 130 may be mounted at a position toward a body part of a user, on which the augmented reality device 100 is worn, and may transmit, to the processor 120, a signal corresponding to a time in which light or ultrasonic waves emitted to the body part returns via reflection. For example, when an infrared sensor measures a time in which infrared rays emitted on the body part of the user returns via reflection and transmits the measured time to the processor 120, the processor 120 may compare a predetermined reference value with the value measured by the infrared sensor to determine whether or not the augmented reality device 100 is worn. As another example, when an ultrasonic sensor measures a time in which ultrasonic waves emitted on the body part of the user returns via reflection and transmits the measured time to the processor 120, the processor 120 may compare a predetermined reference value with the value measured by the ultrasonic sensor to determine whether or not the augmented reality device 100 is worn.

When the wearing sensing sensor 130 is a touch sensor, the weaning sensing sensor 130 may be mounted at a position to touch a body part of a user, on which the augmented reality device 100 is worn, and may transmit, to the processor 120, a signal corresponding to at least one of an electrocardiogram, a heartbeat, and a capacitance, measured when the wearing sensing sensor 130 touches the body part of the user. For example, when an electrocardiogram sensor measures an electrocardiogram on a body surface of the user and transmits the measured electrocardiogram to the processor 120, the processor 120 may determine whether or not the augmented reality device 100 is worn by the user, based on the data measured by the electrocardiogram sensor. When the data measured by the electrocardiogram sensor does not correspond to a general electrocardiogram pattern of a human being, the processor 120 may determine that the augmented reality device 100 is not worn by the user. As another example, when a heartbeat sensor measures the photoplethysmography by using light and transmits the measured photoplethysmography to the processor 120, the processor 120 may determine whether or not the augmented reality device 100 is worn by the user, based on the data measured by the heartbeat sensor. When the data measured by the heartbeat sensor does not correspond to a general heartbeat pattern of a human being, the processor 120 may determine that the augmented reality device 100 is not worn by the user. As another example, when a capacitance sensing sensor measures a change of capacitance occurring when the capacitance sensing sensor touches a body part and transmits the measured change of capacitance to the processor 120, the processor 120 may determine whether or not the augmented reality device 100 is worn by the user, based on the change of capacitance measured b the capacitance sensing sensor.

The communication interface 140 may perform wired or wireless communication with other devices or networks. For example, the augmented reality device 100 may perform communication with the wireless audio device 200, through the communication interface 140. To this end, the communication interface 140 may include a communication module supporting at least one of various communication methods. For example, the communication module may include a communication module performing short-range wireless communication such as Bluetooth, Zigbee, UWB, and Wi-Fi direct or various types of mobile communication such as the $3^{rd}$ generation (3G), the $4^{th}$ generation (4G), the $5^{th}$ generation (5G), etc. or a communication module performing wired communication.

According to the configuration described above, the processor 120 may execute the one or more instructions stored in the memory 110 to control an operation of the communication interface 140, according to whether or not the augmented reality device 100 is worn, based on the signal received from the wearing sensing sensor 130. When the processor 120 determines that the augmented reality device 100 is worn, based on the signal received from the wearing sensing sensor 130, the processor 120 may switch from a first operating mode to a second operating mode to operate the communication interface 140. The wearing sensing sensor 130 may operate in the first operating mode and the second operating mode, and the communication interface 140 may not operate in the first operating mode and may operate in the second operating mode. After the processor 120 switches to the second operating mode, the processor 120 may, through the communication interface 140, periodically scan a pairing packet within a communicable range of the communication interface 140, that is, a coverage range, and receive a pairing packet broadcast from the wireless audio device 200.

According to whether or not an intensity of a signal of the pairing packet received through the communication interface 140 from the wireless audio device 200 satisfies an allowable range for allowing auto pairing with the wireless audio device 200, the processor 120 may perform auto pairing with the wireless audio device 200. When there are a plurality of pairing packets satisfying the allowable range, the processor 120 may perform auto pairing with at least one external device, by setting a higher priority order as an intensity of a signal of the received pairing packet is increased.

For example, the processor 120 may perform auto pairing by comparing an intensity of a signal of the pairing packet received from the wireless audio device 200 with an intensity of a signal corresponding to a maximum allowable distance for allowing auto pairing between the wireless audio device 200 and the augmented reality device 100. When the intensity of the signal of the pairing packet received from the wireless audio device 200 is equal to or greater than the intensity of the signal corresponding to the maximum allowable distance for allowing auto pairing, the processor 120 may perform auto pairing. In contrast, when the intensity of the signal of the pairing packet received from the wireless audio device 200 is less than the intensity of the signal corresponding to the maximum allowable distance for allowing auto pairing, the processor 120 may periodically scan a pairing packet within a communicable range of the communication interface 140. When a pairing packet is scanned, the processor 120 may identify an intensity of a signal of the pairing packet received through the communication interface 140 and may determine again whether or not to perform auto pairing.

As another example, the processor 120 may estimate a distance between the wireless audio device 200 and the augmented reality device 100 based on the intensity of the signal of the pairing packet received from the wireless audio device 200 and may compare the estimated distance with the maximum allowable distance for allowing auto pairing, to perform auto pairing. When the estimated distance is less the maximum allowable distance, the processor 120 may perform auto pairing, and when the estimated distance is greater than the maximum allowable distance, the processor 120 may periodically scan a pairing packet within the communicable range of the communication interface 140.

The wireless audio device 200 may include a memory 210, a processor 220, a wearing sensing sensor 230, and a communication interface 240. One of ordinary skill in the art may understand that other general-purpose components may further be included, in addition to the components illustrated in FIG. 2. Aspects that are the same as the memory 110, the processor 120, the wearing sensing sensor 130, and the communication interface 140 of the augmented reality device 100 described above will not be described in detail below.

With respect to the wireless audio device 200, the memory 210 may store at least one software module including instructions. Each software module may be executed by the processor 220 so that the wireless audio device 200 may perform a predetermined operation or function. The processor 220 may execute the instructions or programmed software mules stored in the memory 210 to control operations or functions performed by the wireless audio device 200.

The wearing sensing sensor 230 may sense whether or not the wireless audio device 200 is worn by a user. The wearing sensing sensor 230 may include a non-touch sensor, a touch sensor, or the like for sensing whether or not the wireless audio device 200 is worn, and may include one or more sensors. The wearing sensing sensor 230 may sense whether or not the wireless audio device 200 is worn, by using homogeneous sensors or heterogeneous sensors together. When the wearing sensing sensor 230 is a non-touch sensor, the wearing sensing sensor 230 may be mounted at a position toward a body part of a user, on which the wireless audio device 200 is worn, and may transmit, to the processor 220, a signal corresponding to a time in which light or ultrasonic waves emitted to the body part returns via reflection. For example, the wearing sensing sensor 230 may include an infrared sensor or an ultrasonic sensor. When the wearing sensing sensor 230 is a touch sensor, the wearing sensing sensor 230 may be mounted at a position to touch a body part of a user, on which the wireless audio device 200 is worn, and may transmit, to the processor 220, a signal corresponding to at least one of an electrocardiogram, a heartbeat, and a capacitance, measured when the wearing sensing sensor 230 touches the body part of the user. For example, the wearing sensing sensor 230 may include an electrocardiogram sensor, a heartbeat sensor, a capacitance sensing sensor, etc. However, the wireless audio device 200 may or may not include the wearing sensing sensor 230. When the wireless audio device 200 not including the wearing sensing sensor 230 is turned on, the processor 220 may directly operate the communication interface 240. The communication interface 240 may perform wired or wireless communication with other devices or networks. The wireless audio device 200 may broadcast, through the communication interface 240, a pairing packet, in order to perform communication with the augmented reality device 100.

Figure 3:
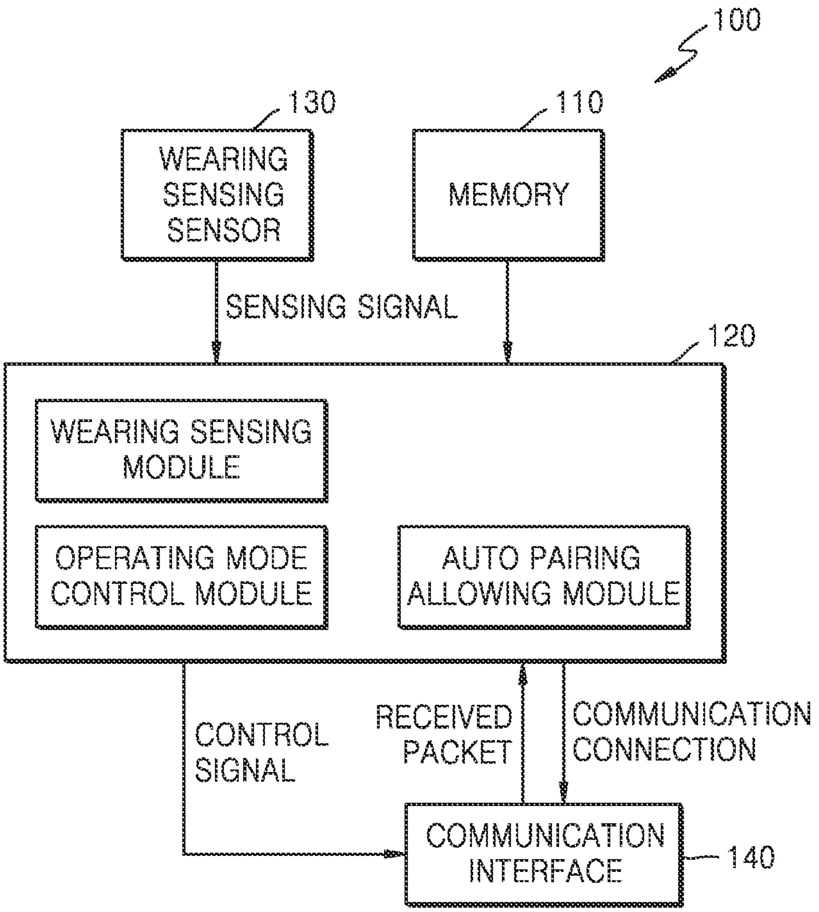
FIG. 3 is a diagram for describing operations between components of an augmented reality device, according to an embodiment.

FIG. 3 is a diagram for describing operations between components of the augmented reality device 100, according to an embodiment.

Referring to FIG. 3, the processor 120 of the augmented reality device 100 may load a wearing sensing module, an operating mode control module, and an auto pairing allowing module stored in the memory 110 and may perform the following operations.

The processor 120 may execute the wearing sensing module to determine, based on a signal received from the wearing sensing sensor 130, whether or not the augmented reality device 100 is worn. The processor 120 may receive, from the wearing sensing sensor 130, a sensing signal according to a type of the wearing sensing sensor 130 and may identify whether the received signal may correspond to a signal which may occur when the augmented reality device 100 is worn by a user, to determine whether or not the augmented reality device 100 is worn.

The processor 120 may execute the operating mode control module to control an operation of the communication interface 140 according to whether or not the augmented reality device 100 is worn. When it is determined that the augmented reality device 100 is worn, the processor 120 may switch from a first operating mode to a second operating mode to operate the communication interface 140. Here, the first operating mode may be a disable mode for deactivating the communication interface 140, and the second operating mode may be an enable mode for activating the communication interface 140.

Before determining whether or not the augmented reality device 100 is worn, the processor 120 may transmit a control signal corresponding to the disable mode to the communication interface 140 to control the communication interface 140 not to operate. After determining whether or not the augmented reality device 100 is worn, the processor 120 may transmit a control signal corresponding to the enable mode to the communication interface 140 to control the communication interface 140 to operate. That is, the communication interface 140 may not operate in the disable mode, and the communication interface 140 may operate in the enable mode, After the processor 120 switches to the enable mode from the disable mode, the processor 120 may, through the communication interface 140, periodically scan a pairing packet within a communicable range of the communication interface 140 and receive a pairing packet broadcast from the wireless audio device 200.

The processor 120 may execute the auto pairing allowing module to perform auto pairing with the wireless audio device 200 according to whether or not an intensity of a signal of the pairing packet received from the wireless audio device 200 satisfies an allowable range for allowing auto pairing with the wireless audio device 200. The processor 120 may perform auto pairing by exchanging, through the communication interface 140, information for auto pairing with the wireless audio device 200.

Figure 4:
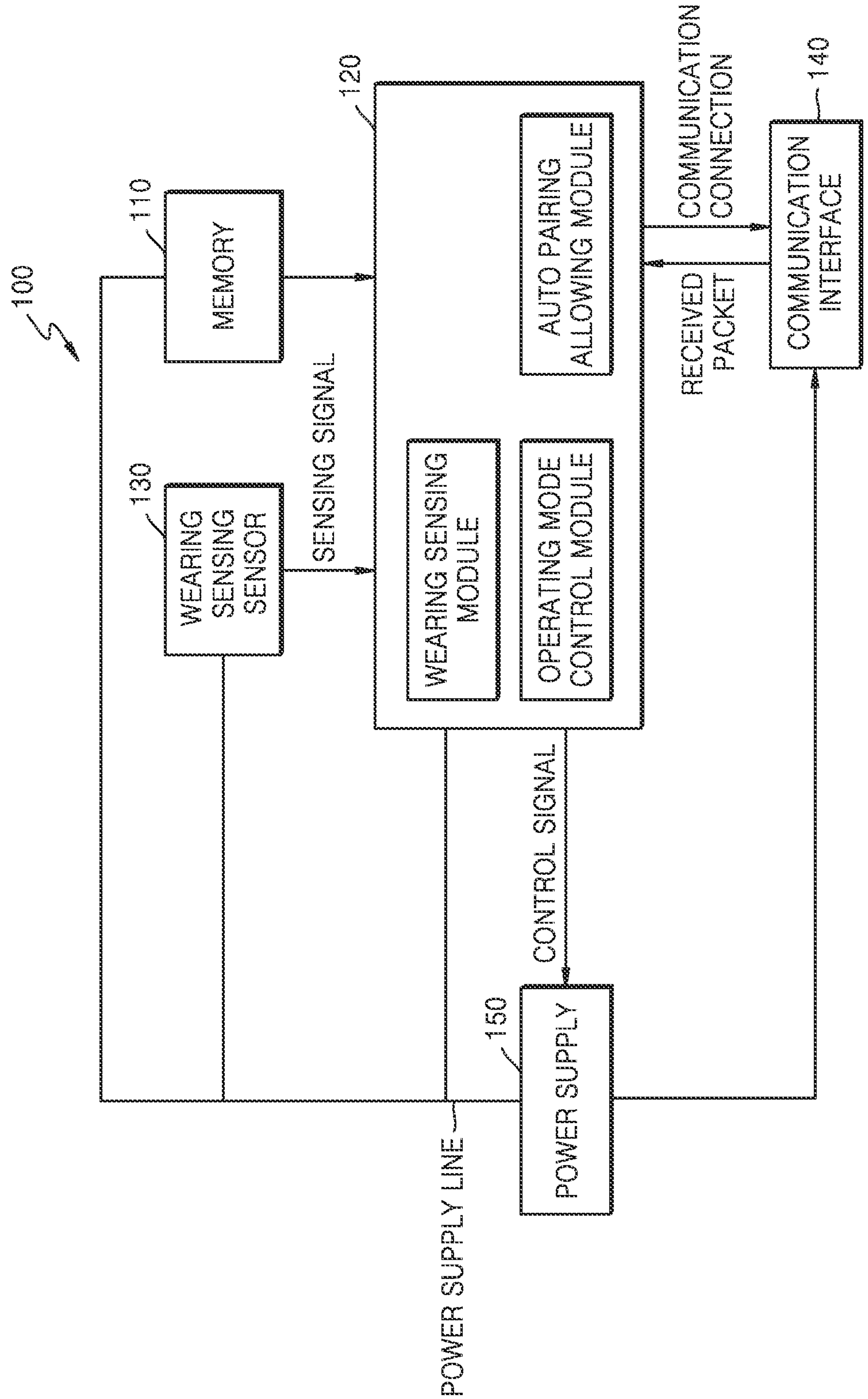
FIG. 4 is a diagram for describing operations between components of an augmented reality device, according to another embodiment.

FIG. 4 is a diagram for describing operations between components of the augmented reality device 100, according to another embodiment.

Referring to FIG. 4, the processor 120 of the augmented reality device 100 may load the wearing sensing module, the operating mode control module, and the auto pairing allowing module stored in the memory 110 and may perform the following operations.

The processor 120 may execute the wearing sensing module to determine, based on a signal received from the wearing sensing sensor 130, whether or not the augmented reality device 100 is worn.

The processor 120 may execute the operating mode control module to control an operation of the communication interface 140 according to whether or not the augmented reality device 100 is worn. When it is determined that the augmented reality device 100 is worn, the processor 120 may switch from a first operating mode to a second operating mode to operate the communication interface 140. Here, the first operating mode may be a sleep mode in which power is not supplied from a power supply 150 to the communication interface 140, and the second operating mode may be a wake-up mode in which power is supplied from the power supply 150 to the communication interface 140.

Before determining whether or not the augmented reality device 100 is worn, the processor 120 may transmit a control signal corresponding to the sleep mode to the power supply 150 to control the power supply 150 not to supply power to the communication interface 140. After determining whether or not the augmented reality device 100 is worn, the processor 120 may transmit a control signal corresponding to the wake-up mode to the power supply 150 to control the power supply 150 to supply power to the communication interface 140. That is, the communication interface 140 may not operate in the sleep mode, and the communication interface 140 may operate in the wake-up mode. After the processor 120 switches to the wake-up mode from the sleep mode, the processor 120 may, through the communication interface 140, periodically scan a pairing packet within a communicable range of the communication interface 140 and receive a pairing packet broadcast from the wireless audio device 200. In FIG. 3 described above, power may be supplied to the communication interface 140, but a control signal determining whether or not to operate the communication interface 140 may be transmitted to the communication interface 140 to control an operation of the communication interface 140. However, in FIG. 4, a control signal determining whether or not to supply power to the communication interface 140 may be transmitted to the power supply 150 to control an operation of the communication interface 140.

The processor 120 may execute the auto pairing allowing module to perform auto pairing with the wireless audio device 200 according to whether or not an intensity of a signal of the pairing packet received from the wireless audio device 200 satisfies art allowable range for allowing auto pairing with the wireless audio device 200. The processor 120 may perform auto pairing by exchanging, through the communication interface 140, information for auto pairing with the wireless audio device 200.

Figure 5:
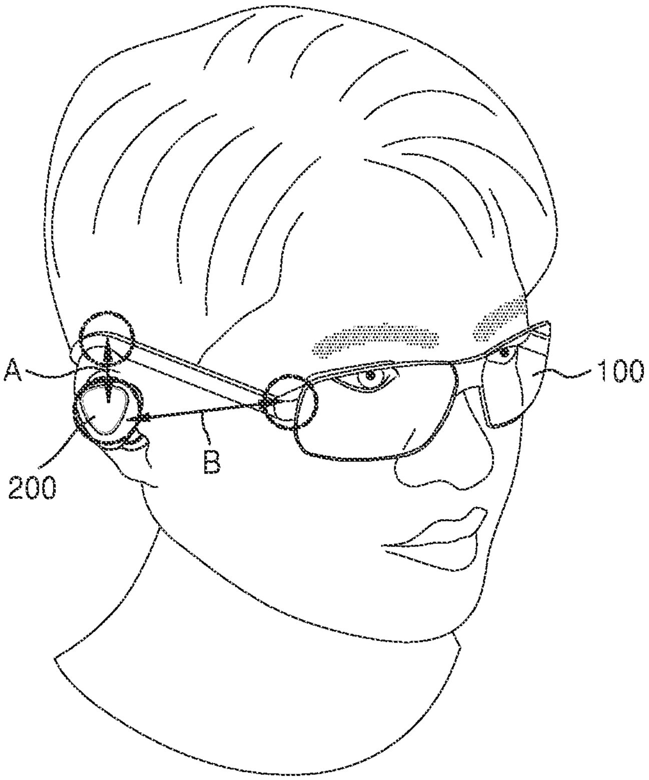
FIG. 5 is a diagram for describing a distance between an augmented reality device and a wireless audio device and a range for allowing auto pairing, when a user wears both of the augmented reality device and the wireless audio device.

FIG. 5 is a diagram for describing a distance between the augmented reality device 100 and the wireless audio device 200 when a user wears both of the devices, and a range for allowing auto pairing.

As illustrated in FIG. 5, when the user wears both of the augmented reality device 100 and the wireless audio device 200 and identifies that the two devices are within an allowable range for allowing auto pairing, unintended communication connection between the augmented reality device 100 and other devices except for the wireless audio device 200 may be effectively prevented. Auto pairing may not be performed just under a condition in which the augmented reality device 100 and the wireless audio device 200 are located to be close to each other. After identify whether or not the both devices are worn by the user, whether or not to alloy auto pairing may be determined. Accordingly, the devices that the user attempts to communication-connect may be primarily identified, based on whether or not the devices are worn, and the auto pairing may be restrictively allowed, and thus, unintended communication-connection with other devices may be prevented.

As illustrated in FIG. 5, with respect to a position on which the wireless audio device 200 provided as an earphone-type is worn and a size of the wireless audio device 200, a position of the communication interface 240 in the wireless audio device 200 may be determined within a small error range of a specific position. However, with respect to the augmented reality device 100 provided as a glasses-type, a position of the communication interface 140 may vary according to where in the augmented reality device 100 the communication interface 140 is to be embedded and mounted. For example, the communication interface 140 may be embedded in a glasses-leg portion A of the augmented reality device 100, the glasses-leg portion A being worn on an ear of a user, or may be embedded in a portion B at which a glasses-frame and a glasses-leg meet each other. As described above, the position of the communication interface 140 may vary. When the communication interface 140 is embedded in the glasses-leg portion A of the augmented reality device 100, a distance between the communication interfaces 140 and 240 of the augmented reality device 100 and the wireless audio device 200 when the user wears both of the devices may be about 3 cm. However, when the communication interface 140 is embedded in the portion B at which the glasses-frame end the glasses-leg meet each other, a distance between the communication interfaces 140 and 240 of the augmented reality device 100 and the wireless audio device 200 when the user wears both of the devices may be about 20 cm at most. Accordingly, the communication interfaces 140 and 240 of the augmented reality device 100 provided as a glasses-type and the wireless audio device 200 provided as an earphone-type may be positioned to be apart from each other by a distance of about 3 cm to about 20 cm, when the user wears both of the devices.

Normally, a distance with respect to which an individual allows access by others exceeds 50 cm. Thus, when a maximum allowable distance for allowing auto pairing between the augmented reality device 100 and the wireless audio device 200 is configured to be less than 50 cm, the problem of unintended communication connection between the augmented reality device 100 and the wireless audio device 200 of a user and devices of other users may be solved. To further guarantee the reliability of auto pairing, a range for allowing auto pairing, that is, a maximum allowable distance for allowing auto pairing, may be configured to be a maximum distance between the augmented reality device 100 and the wireless audio device 200 when the user wears both of the devices.

However, the numerical values described above are used for convenience of explanation and do not limit the disclosure. The numerical values may vary according to a type of each device, a physical structure of a user, a physical or cultural environment, etc.

Figure 6:
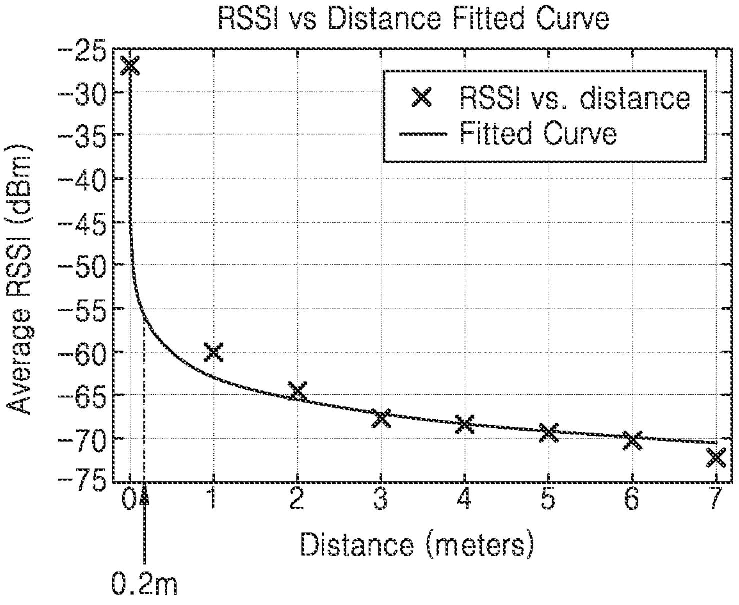
FIG. 6 is a diagram for describing a distance between an augmented reality device and a wireless audio device and an intensity of a signal of a pairing packet received by the augmented reality device, based on the distance between the augmented reality device and the wireless audio device.

FIG. 6 is a diagram for describing an intensity of a signal of a pairing packet received by the augmented reality device 100 according to a distance between the augmented reality device 100 and the wireless audio device 200.

In order to identify whether or not the augmented reality device 100 and the wireless audio device 200 are within an allowable range for allowing auto pairing, the intensity of the signal of the pairing packet received by the augmented reality device 100 from the wireless audio device 200 may be used. A graph illustrated in FIG. 6 indicates an intensity of a signal of a received pairing packet, based on each distance between two devices using Bluetooth communication. To refer to the graph illustrated in FIG. 6, the intensity of the signal of the received pairing packet decreases as the distance between the two devices increases, and the intensity of the signal of the received pairing packet increases as the distance between the two devices decreases. In particular, it is shown that the intensity of the signal of the received pairing packet greatly increases at a distance equal to or less than 50 cm. Therefore, when the augmented reality device 100 and the wireless audio device 200 support Bluetooth communication, the augmented reality device 100 may be designed to allow auto pairing between the two devices when an intensity of a signal of a pairing packet received by the augmented reality device 100 is greater than or equal to an intensity of a signal corresponding to a distance of 50 cm, which is a distance for an individual to allow access by another individual. To further guarantee the reliability of auto pairing, the augmented reality device 100 may be designed to allow auto paring between the two devices when the intensity of the signal of the pairing packet received by the augmented reality device 100 is greater than or equal to an intensity of a signal corresponding to a distance of 20 cm, that is, about −55 dBm in the graph of FIG. 6. In FIG. 6, a case in which the two devices perform the Bluetooth communication is described as an example. However, embodiments of the disclosure are not limited thereto, and the numerical values described above may also vary according to a communication method or an actual measurement environment.

Figure 7:
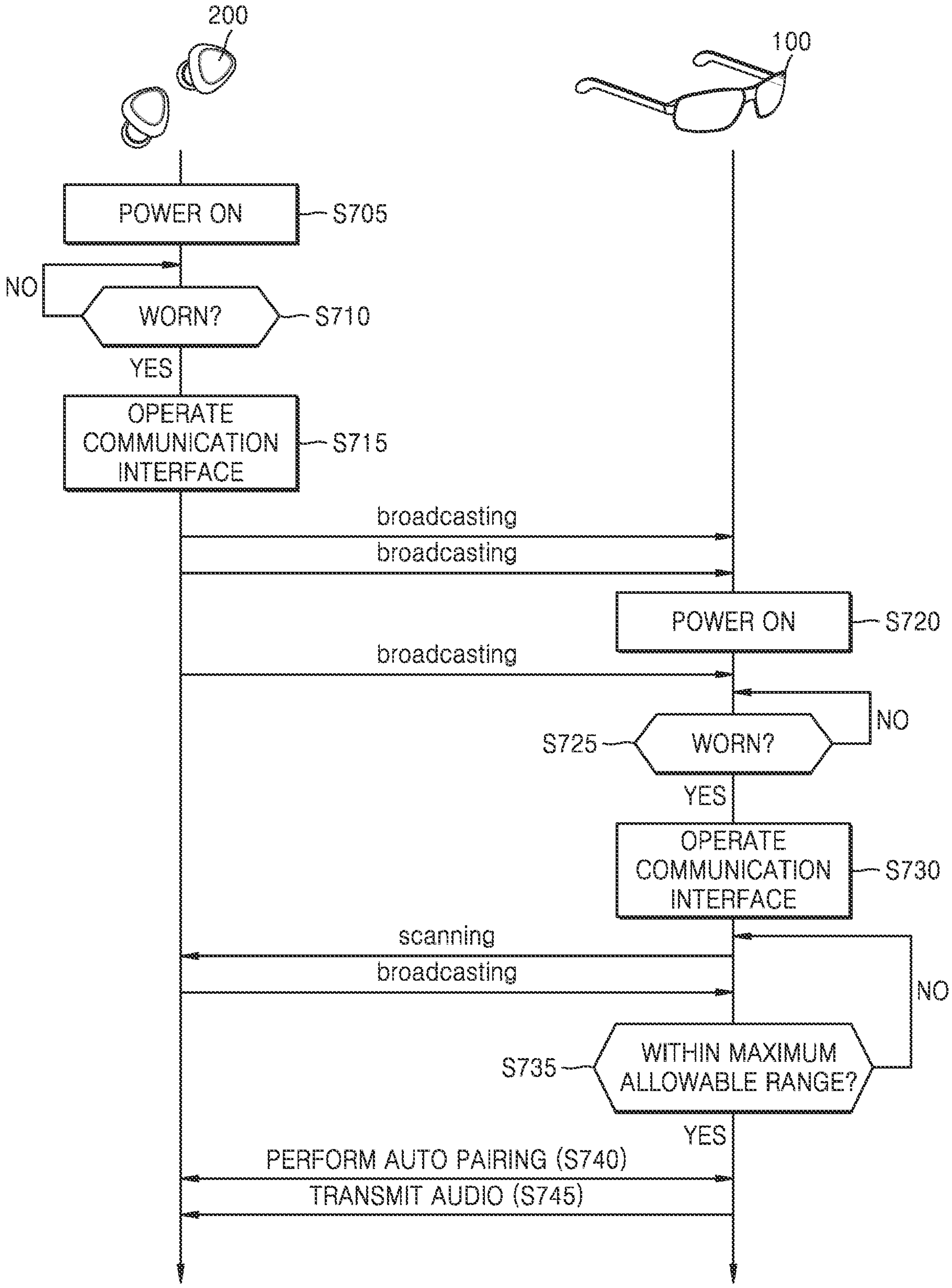
FIGS. 7 and 8 are diagrams for describing a process in which auto pairing between an augmented reality device and a wireless audio device is performed.
Figure 8:
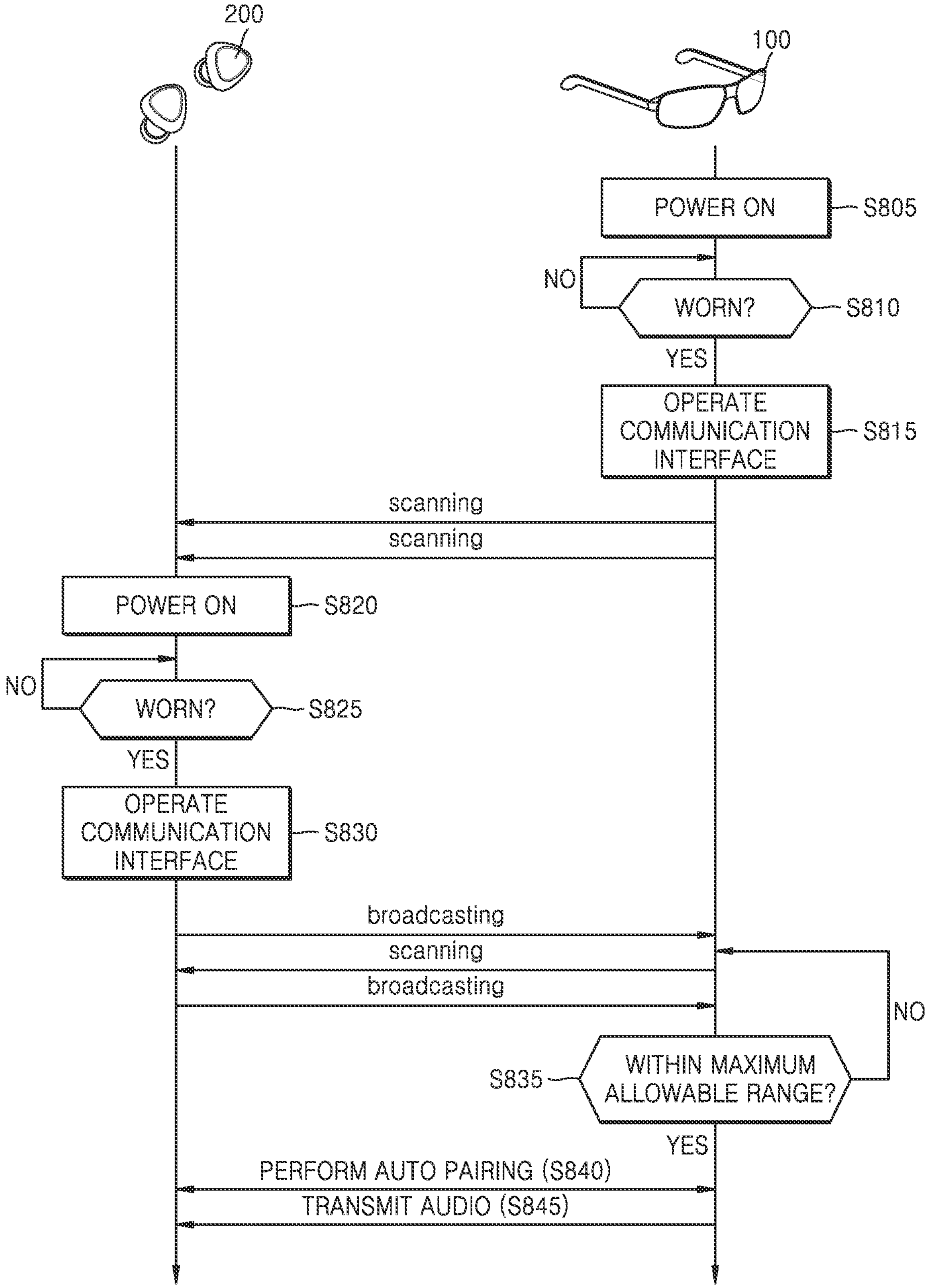

FIGS. 7 and 8 are diagrams for describing a process in which auto pairing between the augmented reality device 100 and the wireless audio device 200 is performed.

FIG. 7 is a diagram for describing a process in which auto pairing between the augmented reality device 100 and the wireless audio device 200 is performed, when a user first wears the wireless audio device 200 before the augmented reality device 100.

Referring to FIG. 7, when the user detaches the wireless audio device 200 from a cradle or a case, the wireless audio device 200 may be turned on in operation S705. Even when the wireless audio device 200 is turned on, the wireless audio device 200 may not operate the communication interface 240 by transmitting a control signal blocking power supplied to the communication interface 240 or preventing an operation of the communication interface 240.

When the wireless audio device 200 includes the wearing sensing sensor 230, the wireless audio device 200 may determine whether or not the wireless audio device 200 is worn by a user in operation S710. Based on a sensing signal of the wearing sensing sensor 230, the wireless audio device 200 may determine whether or not the wireless audio device 200 is worn by the user, and until the wireless audio device 200 is worn by the user, may continually perform the process of determining whether or not the wireless audio device 200 is worn by the user.

When it is determined that the wireless audio device 200 is worn by the user, the wireless audio device 200 may switch from a third operating mode to a fourth operating mode to operate the communication interface 240 in operation S715. After the wireless audio device 200 switches to the fourth operating mode, the wireless audio device 200 may broadcast through the communication interface 240, a pairing packet for communication connection with a peripheral device. The pairing packet may be periodically broadcast. The wearing sensing sensor 230 may operate in the third operating mode and the fourth operating mode, and the communication interface 240 may not operate in the third operating mode and may operate in the fourth operating mode. For example, the third operating mode may be a disable mode for deactivating the communication interface 240, and the fourth operating mode may be an enable mode for activating the communication interface 240. As another example, the third operating mode may be a sleep mode, in which power is not supplied to the communication interface 240 from a power supply, and the fourth operating mode may be a wake-up mode, in which power is supplied to the communication interface 240 from the power supply.

When the user presses a power button of the augmented reality device 100 or performs a predetermined action to turn on the augmented reality device 100, the augmented reality device 100 may be turned on in operation S720. Even when the augmented reality device 100 is turned on, the augmented reality device 100 may not operate the communication interface 140 by transmitting a control signal blocking power supplied to the communication interface 140 or preventing an operation of the communication interface 140.

When the augmented reality device 100 includes the wearing sensing sensor 130, the augmented reality device 100 may determine whether or not the augmented reality device 100 is worn by a user in operation S725. Based on a sensing signal of the wearing sensing sensor 130, the augmented reality device 100 may determine whether or not the augmented reality device 100 is worn by the user, and until the augmented reality device 100 is worn by the user, may continually perform the process of determining whether or not the augmented reality device 100 is worn by the user.

When it is determined that the augmented reality device 100 is worn by the user, the augmented reality device 100 may switch from a first operating mode to a second operating mode to operate the communication interface 140 in operation S730. After the augmented reality device 100 switches to the second operating mode, the augmented reality device 100 may, through the communication interface 140, periodically scan a pairing packet within a communicable range of the communication interface 140 and receive the pairing packet broadcast from the wireless audio device 200. The wearing sensing sensor 130 may operate in the first operating mode and the second operating mode, and the communication interlace 140 may not operate in the first operating mode and may operate in the second operating mode. For example, the first operating mode may be a disable mode for deactivating the communication interface 140, and the second operating mode may be an enable mode for activating the communication interface 140. As another example, the first operating mode may be a sleep mode, in which power is not supplied to the communication interface 140 from the power supply 150, and the second operating mode may be a wake-up mode, in which power is supplied to the communication interface 140 from the power supply 150.

The augmented reality device 100 may determine whether or not an intensity of a signal of the pairing packet received from the wireless audio device 200 through the communication interface 140 satisfies an allowable range for allowing auto pairing with the wireless audio device 200 in operation S735. The augmented reality device 100 may compare the intensity of the signal of the pairing packet received from the wireless audio device 200 with an intensity of a signal corresponding to a maximum allowable distance for allowing auto pairing between the wireless audio device 200 and the augmented reality device 100, and when the intensity of the signal of the received pairing packet is less than the intensity of the signal corresponding to the maximum allowable distance, may again periodically scan a pairing packet within a communicable range of the communication interface 140.

When the intensity of the signal of the received pairing packet is greater than or equal to the intensity of the signal corresponding to the maximum allowable distance, the augmented reality device 100 may perform auto pairing between the wireless audio device 200 and the augmented reality device 100 in operation S740. The augmented reality device 100 and the wireless audio device 200 may exchange information for auto pairing to perform auto pairing.

When communication connection between the wireless audio device 200 and the augmented reality device 100 is completed via auto pairing between the two devices, the augmented reality device 100 may transmit an audio signal to the wireless audio device 200 in operation S745. Thus, the user may see a real scene and a virtual image through the augmented reality device 100 and may hear information about augmented reality viewed through the augmented reality device 100 or information about an operation or a control menu of the augmented reality device 100 through the wireless audio device 200.

FIG. 8 is a diagram for describing a process in which auto pairing between the augmented reality device 100 and the wireless audio device 200 is performed, when a user first wears the augmented reality device 100 before the wireless audio device 200. FIG. 8 is different only in terms of the order in which the augmented reality device 100 is worn before the wireless audio device 200, and there are many of the same aspects as FIG. 7, and thus, the same aspects are not described in detail.

Referring to FIG. 8, when the user presses a power button of the augmented reality device 100 or performs a predetermined action to turn on the augmented reality device 100, the augmented reality device 100 may be turned on in operation S805. When the augmented reality device 100 includes the wearing sensing sensor 130, the augmented reality device 100 may determine whether or not the augmented reality device 100 is worn by the user in operation S810. When it is determined that the augmented reality device 100 is worn by the user, the augmented reality device 100 may switch from a first operating mode to a second operating mode to operate the communication interface 140 in operation S815. After the augmented reality device 100 switches to the second operating mode, the augmented reality device 100 may, through the communication interface 140, periodically scan a pairing packet within a communicable range of the communication interface 140.

When the user detaches the wireless audio device 200 from a cradle or a case, the wireless audio device 200 may be turned on in operation S820. When the wireless audio device 200 includes the wearing sensing sensor 230, the wireless audio device 200 may determine whether or not the wireless audio device 200 is worn by the user in operation S825. When it is determined that the wireless audio device 200 is worn by the user, the wireless audio device 200 may switch from a third operating mode to a fourth operating mode to operate the communication interface 240 in operation S830. After the wireless audio device 200 switches to the fourth operating mode, the wireless audio device 200 may broadcast through the communication interface 240, a pairing packet for communication connection with a peripheral device. The pairing packet may be periodically broadcast.

The augmented reality device 100 may periodically through the communication interface 140, the pairing packet broadcast from the wireless audio device 200, and when the pairing packet broadcast from the wireless audio device 200 is received, the augmented reality device 100 may determine whether or not an intensity of a signal of the pairing packet received through the communication interface 140 from the wireless audio device 200 satisfies an allowable range for allowing auto pairing with the wireless audio device 200 in operation S835. When the intensity of the signal of the received pairing packet is greater than or equal to an intensity of a signal corresponding to a maximum allowable distance the augmented reality device 100 may perform auto pairing in operation S840. When communication connection between the wireless audio device 200 and the augmented reality device 100 is completed via auto pairing between the two devices, the augmented reality device 100 may transmit an audio signal to the wireless audio device 200 in operation S845.

Figure 9:
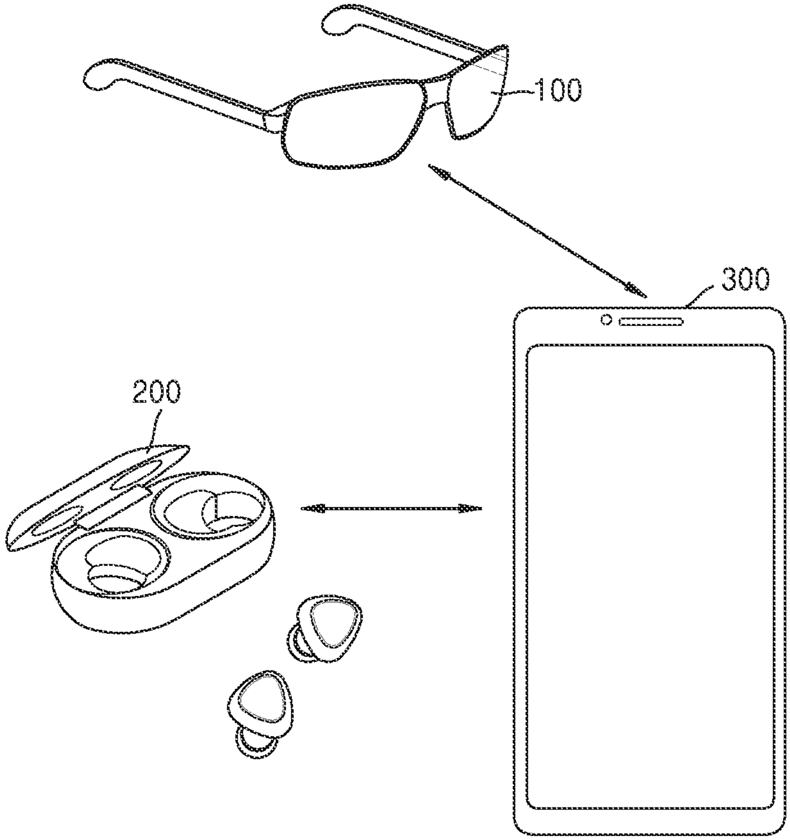
FIG. 9 is a diagram for describing auto pairing between an augmented reality device, a wireless audio device, and content reproducing device.

FIG. 9 is a diagram for describing auto pairing between the augmented reality device 100, the wireless audio device 200, and a content reproducing device 300.

When the augmented reality device 100 and the wireless audio device 200 include the content reproducing device 300 capable of providing content, a user may manipulate the content reproducing device 300 to reproduce content desired by the user. Here, auto pairing between the devices may be performed as described above, in order to transmit a video signal of the content provided by the content reproducing device 300 to the augmented reality device 100 and an audio signal of the content provided by the content reproducing device 300 to the wireless audio device 200, so that the user may see a video image of the content through the augmented reality device 100 and hear an audio sound corresponding to the video image through the wireless audio device 200.

When it is determined by using the wearing sensing sensor 230 that the wireless audio device 200 is worn, the wireless audio device 200 may operate the communication interface 240 and may periodically broadcast, through the communication interface 240, a first pairing packet. When it is determined by using the wearing sensing sensor 130 that the augmented reality device 100 is worn, the augmented reality device 100 may operate the communication interface 140 and may periodically broadcast, through the communication interface 140, a second pairing packet.

According to whether or not an intensity of a signal of the pairing packet received, through a communication interface, from the wireless audio device 200 satisfies a first allowable range for allowing auto pairing with the wireless audio device 200, the content reproducing device 300 may perform first auto pairing with the wireless audio device 200, and according to whether or not an intensity of a signal of the pairing packet received from the augmented reality device 100 satisfies a second allowable range for allowing auto pairing with the augmented reality device 100, the content reproducing device 300 may perform second auto pairing with the augmented reality device 100. When communication connection is completed via auto pairing between the content reproducing device 300 and each of the augmented reality device 100 and the wireless audio device 200, a user may view a video image of content reproduced by the content reproducing device 300 through the augmented reality device and hear an audio sound of the content through the wireless audio device 200.

Figure 10:
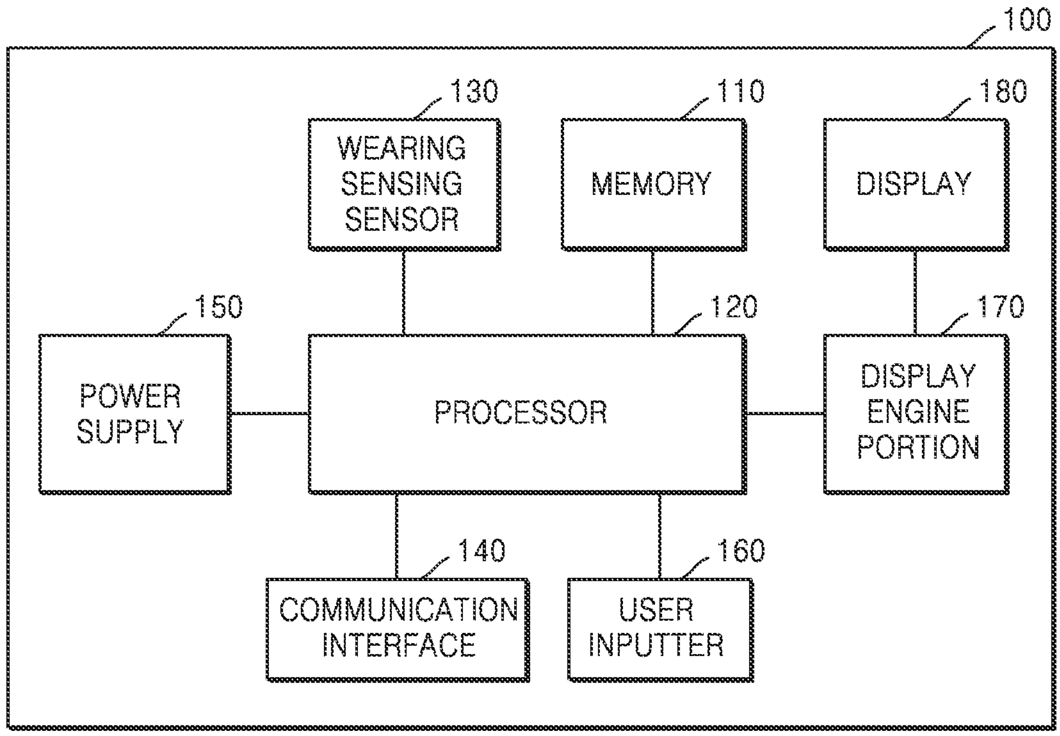
FIG. 10 is a diagram showing additional components of an augmented reality device.

FIG. 10 is a diagram showing additional components of the augmented reality device 100.

The augmented reality device 100 may further include a user inputter 160 and a display 180, in addition to the processor 120, the wearing sensing sensor 130, the communication interface 140, and the power supply 150 described above. In addition, the augmented reality device 100 may further include a position sensor configured to sense a position of the augmented reality device 100, an inertia sensor configured to sense a motion of the augmented reality device 100, or the like, and the description thereof is omitted.

The user inputter 160 may receive a user input for controlling the augmented reality device 100 and may include a LiDAR sensor, a touch sensor, or the like. When the user inputter 160 is a LiDAR sensor, a user gesture within a sensing range of the LiDAR sensor may be received as a user input. When the user inputter 160 is a touch sensor, user manipulation received through the touch sensor may be received as a user input.

A display engine portion 170 may include an optical engine generating and projecting a virtual image and a guide portion guiding light of the virtual image projected from the optical engine to a display 180. The display 180 may include a see-through type light guide plate (waveguide) embedded in a left-eye lens portion and/or a right-eye lens portion of the augmented reality device 100. The display 180 may display information about an object or a virtual image indicating information or a control menu with respect to an operation of the augmented reality device 100. When a pop-up of the virtual image is displayed on the display 180, the user wearing the augmented reality device 100 may manipulate the pop-up of the virtual image.

The augmented reality device 100 or the wireless audio device 200 described herein may be implemented by a hardware component, a software component, and/or a combination of a hardware component and a software component. For example, the augmented reality device 100 described according to the embodiments may be implemented by using one or more general-purpose computers or special-purpose computers, such as processors, arithmetic logic units (ALUs), ASICs, DSPs, DSPDs, PLDs, microcomputers, microprocessors, or any other devices capable of executing instructions and making responses.

The software may include a computer program, a code, an instruction, or a combination of at least two thereof, and may configure a processing device or independently or collectively instruct the processing device to operate as desired.

The software may be implemented by a computer program including an instruction stored in computer-readable storage media. Computer-readable recording media may include, for example, magnetic storage media (e.g., ROM, RAM, a floppy disc, a hard disc, etc.), optical reading media (e.g., compact disc (CD)-ROM, a digital versatile disc (DVD), etc.), etc. The computer-readable recording media may be distributed in computer systems connected through a network and may store and execute computer-readable codes in a distributed fashion. Media may be readable by a computer, stored in a memory, and executed by a processor.

A computer may be a device for calling the instructions stored in the storage media and performing, in response to the called instructions, operations according to the embodiments described above, and may include the augmented reality device 100 or the wireless audio device 200 according to the embodiments described above.

The computer-readable storage media may include non-transitory storage media. Here, the term "non-transitory" of non-transitory storage media only denotes that the non-transitory storage media do not include a signal and are tangible, and does not distinguish whether the storage media semi-permanently or temporarily store the data.

Also, the method of performing auto pairing between the augmented reality device 100 and the wireless audio device 200 or the method of performing auto pairing between the content reproducing device 300 and each of the augmented reality device 100 and the wireless audio device 200, according to the embodiments described above, may be implemented by being provided in a computer program product. The computer program product may be transacted between a seller and a purchaser, as a product.

The computer program product may include a software program or a computer-readable storage medium in which a software program is stored. For example, the computer program product may include a software program-type product (e.g., a downloadable application) electronically distributed by a manufacturer of the augmented reality device 100 or the wireless audio device 200 or electronic markets (e.g., Google Play Store, App Store, etc.). For electronic distribution, at least a portion of a software program may be stored in a storage medium or temporarily generated. In this case, the storage medium may include a server of a manufacturer, a server of an electronic market, or a storage medium of a broadcasting server temporarily storing the software program.

The computer program product may include a storage medium of a server or a storage medium of a terminal in a system including the server and the terminal (e.g., an augmented reality device). Alternatively, when there is a third device (e.g., a content reproducing device, such as a smartphone) communication-connected to the server or the terminal, the computer program product may include a storage medium of the third device. Alternatively, the computer program product may directly include a software program transmitted from the server to the terminal or the third device or from the third device to the terminal.

In this case, one the server, the terminal, and the third device may perform the method according to the embodiments described above by executing the computer program product. Alternatively, at least two of the server, the terminal, and the third device may perform, in a distributed fashion, the method according to the embodiments described above by executing the computer program product.

For example, the server (e.g., a cloud server or an artificial intelligence (AI) serve may execute a computer program product stored in the server and may control the terminal communication-connected to the server to perform the method according to the embodiments described above.

As another example, the third device may execute the computer program product and may control the terminal communication-connected to the third device to perform the method according to the embodiments described above.

When the third device executes the computer program product, the third device may download the computer program product from the server and execute the downloaded computer program product. Alternatively, the third device may execute the computer program product provided in a pre-loaded state to perform the method according to the embodiments described above.

As above, embodiments are described based on the limited embodiments and drawings. However, based on the descriptions, various modifications and alterations are possible for one of ordinary skill in the art. For example, even when the described techniques are performed in a different order from the described method, or the described components, such as the electronic device, the structure, the circuit, etc., are integrated or combined in a different form from the described method or substituted or replaced by other components or equivalents, appropriate results may be achieved.

What is claimed is:

1. An augmented reality device comprising:
- a sensor;
- a communication interface;
- a memory storing one or more instructions; and
- a processor configured to execute the one or more instructions,
- wherein the one or more instructions, when executed by the processor, cause the augmented reality device to:
  - based on determining that the augmented reality device is being worn by a user using a first signal received from the sensor, switch from a first operating mode in which the communication interface is deactivated to a second operating mode for activating the communication interface; and
- perform auto pairing with a wireless audio device worn by the user according to whether an intensity of a second signal of a pairing packet received from the wireless audio device through the communication interface is within a predetermined range for allowing auto pairing with the wireless audio device.

2. The augmented reality device of claim 1, wherein the one or more instructions, when executed by the processor, cause the augmented reality device to perform the pairing by comparing the intensity of the second signal of the pairing packet with an intensity of a third signal corresponding to a maximum allowable distance for allowing the auto pairing between the wireless audio device and the augmented reality device.

3. The augmented reality device of claim 2, wherein the one or more instructions, when executed by the processor, cause the augmented reality device to:
- based on the intensity of the second signal of the pairing packet being greater than or equal to the intensity of the third signal corresponding to the maximum allowable distance, perform the auto pairing; and
- based on the intensity of the second signal of the pairing packet being less than the intensity of the third signal corresponding to the maximum allowable distance, periodically scan for a pairing packet within a communicable range of the communication interface.

4. The augmented reality device of claim 1, wherein the one or more instructions, when executed by the processor, cause the augmented reality device to, after switching to the second operating mode, periodically scan, using the communication interface, for a pairing packet within a communicable range of the communication interface and receive, using the communication interface, a pairing packet broadcast from the wireless audio device.

5. The augmented reality device of claim 1, wherein the sensor is configured to operate in the first operating mode and the second operating mode, and
- the communication interface is configured to operate in the second operating mode and not operate in the first operating mode.

6. The augmented reality device of claim 1, further comprising a power supply configured to:
- not supply power to the communication interface in the first operating mode which is a sleep mode, and
- supply power to the communication interface in the second operating mode which is a wake-up mode.

7. The augmented reality device of claim 1, wherein the sensor is mounted at a position to track a pupil of the user wearing the augmented reality device, and the sensor is configured to transmit, to the processor, a fourth signal corresponding to eye information of the user.

8. The augmented reality device of claim 1, wherein the sensor is mounted at a position toward a body part of the user on which the augmented reality device is worn, and the sensor is configured to transmit, to the processor, a fifth signal corresponding to a time in which light or ultrasonic waves emitted to the body part of the user returns via reflection.

9. The augmented reality device of claim 1, wherein the sensor is mounted at a position contacting a body part of the user on which the augmented reality device is worn, and the sensor is configured to transmit, to the processor, a sixth signal corresponding to at least one of an electrocardiogram, a heartbeat, and a capacitance measured when the sensor contacts the body part of the user.

10. An augmented reality system comprising:
- a wireless audio device configured to, based on determining that the wireless audio device is being worn by a user using a first sensor, operate a first communication interface and broadcast a pairing packet through the first communication interface; and
- an augmented reality device configured to, based on determining that the augmented reality device is being worn by the user using a second sensor, switch from a first operating mode in which a second communication interface is deactivated to a second operating mode for activating the second communication interface, and perform auto pairing with the wireless audio device worn by the user according to whether an intensity of a first signal of a pairing packet received, through the second communication interface, from the wireless audio device is within a predetermined range for allowing auto pairing with the wireless audio device.

11. The augmented reality system of claim 10, wherein the augmented reality device is further configured to perform the auto pairing by comparing the intensity of the first signal of the pairing packet with an intensity of a second signal corresponding to a maximum allowable distance for allowing the auto pairing between the wireless audio device and the augmented reality device.

12. The augmented reality system of claim 10,
- wherein the wireless audio device is further configured to, based on determining that the wireless audio device is being worn by the user using the first sensor, switch from a third operating mode to a fourth operating mode to operate the first communication interface.

13. A non-transitory computer-readable recording medium having recorded thereon a program to be executed by a computer, the non-transitory computer-readable recording medium comprising:

instructions for switching from a first operating mode in which a communication interface is deactivated to a second operating mode for activating the communication interface, based on determining that an augmented reality device is being worn by a user using a first signal received from a sensor; and instructions for performing auto pairing with a wireless audio device worn by the user according to whether an intensity of a second signal of a pairing packet received, through the communication interface from the wireless audio device, is within a predetermined range for allowing auto pairing with the wireless audio device.

* * * * *